United States Patent [19]

Stamper

[11] 4,168,787
[45] Sep. 25, 1979

[54] VARIABLE STROKE FLUID LUBRICANT DISPENSER

[75] Inventor: Eugene E. Stamper, Spencer, Iowa

[73] Assignee: Superior, Inc., Spencer, Iowa

[21] Appl. No.: 852,841

[22] Filed: Nov. 18, 1977

[51] Int. Cl.² ............................................. F16N 3/12
[52] U.S. Cl. ..................................... 222/256; 222/380
[58] Field of Search ............... 222/256, 340, 341, 380, 222/383; 137/859

[56] References Cited

U.S. PATENT DOCUMENTS

| 259,682 | 6/1882 | Gruber | 137/859 X |
| 379,708 | 3/1888 | Long | 222/383 |
| 1,621,172 | 3/1927 | MacKenzie | 222/256 |
| 1,941,140 | 12/1933 | Dodge | 222/256 |
| 1,950,782 | 3/1934 | Burt et al. | 222/256 X |
| 2,016,400 | 10/1935 | Tear | 222/383 |
| 2,027,500 | 1/1936 | Vanderlip | 222/383 |
| 2,833,449 | 5/1958 | Morton | 222/256 |
| 3,316,853 | 5/1967 | Schneller | 222/383 X |

FOREIGN PATENT DOCUMENTS

| 545676 | 7/1957 | Canada | 137/859 |
| 572433 | 1/1958 | Italy | 137/859 |

Primary Examiner—David A. Scherbel
Attorney, Agent, or Firm—Henderson & Strum

[57] ABSTRACT

A head assembly for a fluid lubricant dispenser including a piston cavity having inlet and outlet ports disposed near the bottom of the cavity. The inlet and outlet ports are controlled by check valves that function oppositely and simultaneously to allow the flow of lubricant in one direction. The location of the inlet port and the use of a check valve in conjunction with the inlet port allows for effective operation of the lubricant dispenser with any appreciable movement of the piston via the operative lever mechanism.

2 Claims, 6 Drawing Figures

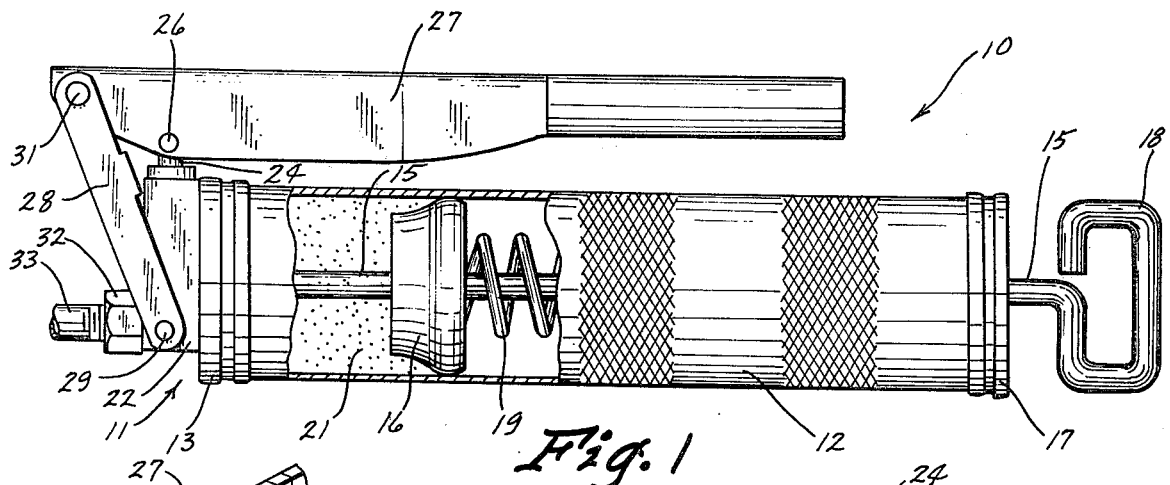
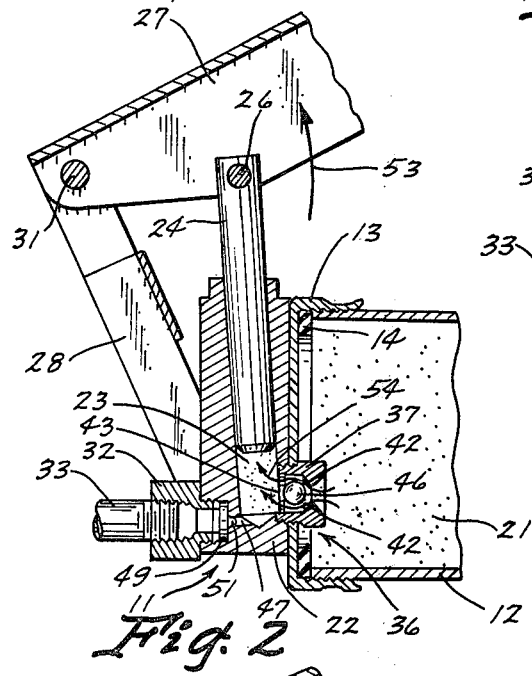
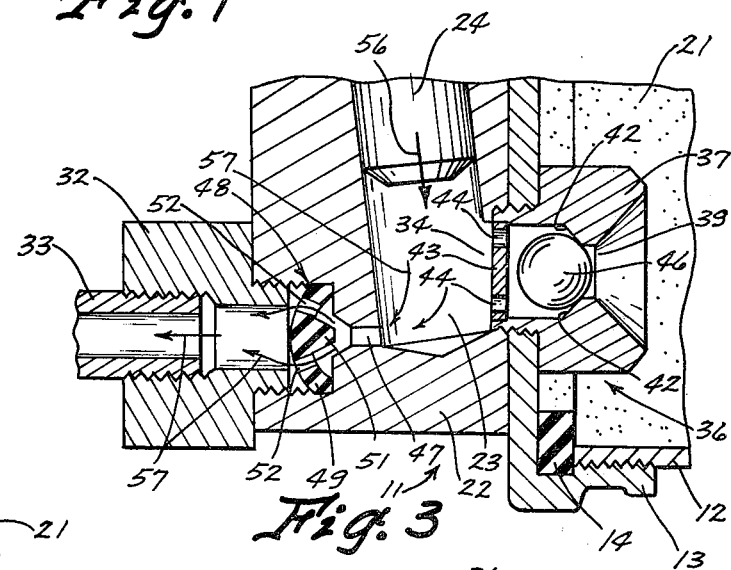
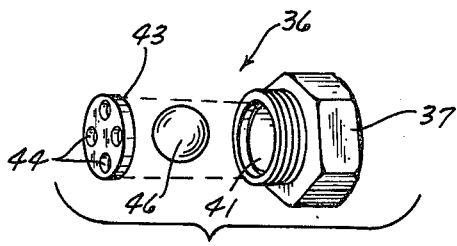
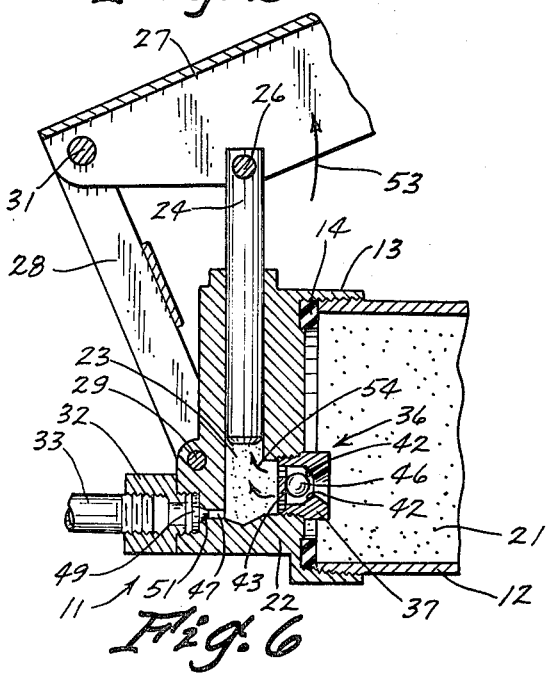

VARIABLE STROKE FLUID LUBRICANT DISPENSER

BACKGROUND OF THE INVENTION

The present invention relates generally to fluid lubricant dispensing equipment and more particularly to a novel head assembly for a fluid lubricant dispenser.

Conventional lubricant dispensing head assemblies include an inlet port from the lubricant supply tube to the piston cavity wherein the inlet port is located at the upper end of the cavity and slightly below the area of the cavity occupied by the piston when the piston is in the fully retracted position. Thus, to charge the cavity with lubricant, the piston must be fully retracted to clear the inlet port before allowing lubricant to pass into the cavity.

One of the most critical problems voiced by users of conventional equipment is that such equipment cannot be conveniently or satisfactorily used in tight or confined work areas since the operating lever must be fully extended to recharge the cavity with lubricant after each successive use.

Those concerned with this problem have recognized the need for an improved lubricant dispenser suitable for use in confined work areas.

SUMMARY OF THE INVENTION

The head assembly of the instant invention includes a piston cavity having an inlet port located near the bottom thereof and an inlet check valve controlling the flow of lubricant through the inlet port. An outlet port is located near the bottom of the piston cavity opposite from the inlet port and a discharge check valve controls the flow of lubricant through the outlet port.

In operation, retraction of the piston from the piston cavity creates a vacuum that simultaneously acts to open the inlet check valve and close the discharge check valve; thus, lubricant is drawn into the piston cavity. As the piston is depressed into the cavity, the pressure acts to simultaneously close the inlet check valve and open the discharge check valve allowing discharge of the lubricant to the desired area.

The inlet check valve is not biased or spring loaded and is free to move to allow the flow of lubricant into the piston cavity at any time the piston is retracted any appreciable distance. The invention includes two check valves controlling the flow of lubricant through inlet and outlet ports into and out of the piston cavity which allows the flow of lubricant in only one direction and allows such flow with any appreciable movement of the piston.

The instant invention is unique in design by the location of the inlet port and the addition of an inlet check valve working in conjunction with a discharge check valve, which design allows for variable positive displacement action. The head assembly overcomes the problems of the prior art devices by allowing lubricant to enter the piston cavity upon any short stroke backward movement of the piston; thus, allowing use in restricted or confined areas. Further, the head assembly allows the dispensation of any amount of lubricant up to the capacity of the piston cavity. The user can limit the retraction of the piston to any degree desired to deliver a predetermined amount of lubricant.

The head assembly can be incorporated into any conventional lubricant dispenser such as the lever or pistol grip type. Further, it can be incorporated into single piece heads such as die cast aluminum, steel, zinc or plastic; or into multi-piece constructed heads; and it can be used in devices where the piston cavity is at right angles to or inclined with respect to the lubricant supply tube.

An object of the present invention is the provision of an improved head assembly for a fluid lubricant dispenser.

Another object is to provide a head assembly which is simple in design, easy to manufacture, and adaptable for use with various materials of construction and types of dispensing devices.

A further object of the invention is the provision of a head assembly which will dispense a controlled amount of lubricant.

Still another object is to provide a head assembly which will allow the use of a lubricant dispenser in a limited or confined work area.

Other objects, advantages and novel features of the present invention will become apparent from the following detailed description of the invention when considered in conjunction with the accompanying drawings.

BRIEF DESCRIPTION OF THE DRAWINGS

FIG. 1 is a side elevational view of a lubricant dispenser with portions of the lubricant supply tube cutaway to show the means of supplying lubricant to the head assembly of the invention;

FIG. 2 is a sectional view of the head assembly showing the flow of lubricant into the piston cavity as the piston is retracted;

FIG. 3 is an enlarged sectional view of the head assembly showing the flow of lubricant from the piston cavity as the piston is depressed;

FIG. 4 is an exploded perspective view showing the construction of the inlet check valve;

FIG. 5 is an exploded perspective view showing the discharge check valve and the discharge adapter fitting; and FIG. 6 is a sectional view similar to FIG. 2 except the piston cavity is at right angles to the lubricant supply tube rather than inclined as in FIG. 2.

DESCRIPTION OF THE PREFERRED EMBODIMENTS

Referring now to the drawings, wherein like reference numerals designate identical or corresponding parts throughout the several views, FIG. 1 shows a typical lubricant dispenser 10 wherein the head assembly 11 of this invention can be utilized. The dispenser 10 includes a lubricant supply tube 12 threadably connected to the cap 13 of the head assembly 11 and sealed by head gasket 14 (FIG. 2). Plunger rod 15 is disposed interior to tube 12 and extends through openings in plunger 16 and end cap 17. A handle 18 is formed at the end of rod 15 exterior of tube 12, and a plunger spring 19 is disposed around rod 15 between plunger 16 and end cap 17. Spring 19 exerts pressure on the lubricant supply 21 and forces it toward the head assembly 11.

As most clearly shown in FIGS. 2 and 6, the head assembly 11 includes a cylinder head 22 having a cavity 23 formed therein. A piston 24 is slidable engaged within the cavity 23 and is pivotally attached at 26 to an intermediate portion of level 27. Link 28 is pivotally attached at 29 to cylinder head 22 and at 31 to one end of lever 27. Movement of lever 27 retracts and depresses the piston 24 within cavity 23 and actuates the flow of lubricant 21 from the dispenser 10. Discharge adapter 32 and extension 33 are threadably attached to the cylinder head 22 and serve to direct the lubricant 21 to the desired point.

Referring now to FIG. 3, an inlet port 34 is disposed at the lower end of cavity 23 and communicates between the interior of supply tube 12 and cavity 23. Inlet port 34 is disposed laterally from piston 24 when piston 24 is fully depressed within cavity 23. An inlet check valve 36 is threadably attached to inlet port 34 and controls the flow of lubricant 21 into cavity 23. As shown in FIGS. 3 and 4, the inlet check valve 36 includes a body 37 having a hollow chamber 38, inlet opening 39, and outlet opening 41. Inlet opening 39 has a seating surface 42 formed at the interior thereof and outlet opening 41 has a retainer 43 attached thereto. Retainer 43 has a plurality of holes 44 formed therein to allow the through flow of lubricant 21. A ball 46 is disposed within the chamber 38 between the seating surface 42 and the retainer 43. The ball 46 is unbiased and moves freely within the chamber 38 between sealing contact with seating surface 42 and contact with retainer 43.

An outlet port 47 is located at the lower end of cavity 23 opposite from the inlet port 34. Outlet port 47 communicates between cavity 23 and the atmosphere. A discharge check valve 48 is disposed over outlet port 47 and controls the flow of lubricant 21 from cavity 23. As shown most clearly in FIG. 5, the discharge check valve includes a resilient disc 49, a centrally disposed projection 51, and a plurality of openings 52 disposed radially outward from the projection 51. As shown in FIG. 3, the projection 51 is outwardly displaced from the outlet port 47 when pressure in the cavity 23 is greater than pressure of the atmosphere; otherwise, projection 51 is in sealing contact with outlet port 47.

In operation, the dispenser 10 is charged with a supply of lubricant 21 and the spring biased plunger 16 forces the lubricant 21 toward the head assembly 11. As the lever 27 is moved upward, as indicated by direction arrow 53 of FIGS. 2 and 6, the piston 24 is retracted from cavity 23 creating a vacuum in cavity 23. The vacuum created simultaneously acts to open the inlet check valve 36 by unseating ball 46 from seating surface 42, and to close the discharge check valve 48 by causing the projection 51 to sealingly contact outlet port 47. Thus, lubricant 21 flows through the inlet opening 39, around ball 46, and through holes 44 into cavity 23 as indicated by flow arrows 54 of FIGS. 2 and 6. It is readily apparent that only the slightest upward movement of piston 24 is required to allow the flow of lubricant 21 into cavity 23.

As piston 24 is depressed into cavity 23, as indicated by direction arrow 56 of FIG. 3, the pressure is transmitted through the fluid lubricant 21 in cavity 23 and simultaneously acts to close the inlet check valve 36 by causing the ball 46 to sealingly contact the seating surface 42, and to open the discharge check valve 48 by outwardly displacing the projection from the outlet port 47. As indicated by the flow arrows 57 of FIG. 3, lubricant 21 flows through the outlet port 47, around projection 51, through the openings 52, and through the interior of extension 33 to the desired point.

As piston 24 approaches the bottom of cavity 23, cavity 23 is substantially purged of lubricant 21. The piston 24 is then successively retracted and depressed until the desired amount of lubricant is dispensed. It is understood that the distance the piston 24 is retracted can be varied depending on the amount of lubricant to be dispensed or the available working area which may limit the upward movement of lever 27.

Thus, it can be seen that a novel head assembly has been provided which accomplishes at least all of its stated objectives.

Obviously many modifications and variations of the present invention are possible in light of the above teachings. It is therefore to be understood that, within the scope of the appended claims, the invention may be practiced otherwise than as specifically described.

I claim:

1. A head assembly for a fluid lubricant dispenser, said head assembly comprising:
  a cylinder head having a cylindrical cavity formed therein;
  a piston slidably engaged within said cavity for movement between a first retracted position and a second depressed position wherein the end of said piston is near the bottom of said cavity;
  means for moving said piston between said first position and said second position;
  an inlet port disposed laterally from said piston when said piston is in said second depressed position, said inlet port communicating between said cavity and a lubricant supply tube in a straight passage
  an inlet check valve attached to said inlet port and controlling the flow of lubricant through said inlet port and being free to the passage of lubricant through said inlet port into said cavity, wherein said inlet check valve includes:
  a body having a hollow chamber formed therein, and inlet and outlet openings;
  a seating surface formed at the interior of said inlet opening;
  a lubricant pervious retainer attached to said outlet opening; and
  a free floating ball disposed within said chamber between said seating surface and said retainer, said ball being in sealing contact with said seating surface when pressure at said outlet opening is greater than pressure at said inlet opening, thereby allowing the flow of lubricant from said lubricant supply tube into said cavity, and preventing the flow of lubricant from said cavity into said lubricant supply tube, and said head assembly also comprises:
  an outlet port disposed laterally from said piston when said piston is in said second depressed position, said outlet port being disposed opposite of said inlet port, said outlet port communicating between said cavity and the atmosphere; and,
  a discharge check valve attached to said outlet port and controlling the flow of lubricant through said outlet port and preventing the passage of lubricant through said outlet port into said cavity wherein said discharge check valve includes:
  a resilient disc having a centrally disposed projection and a plurality of openings disposed radially outward from said projection, said projection being in sealing contact with said outlet port when pressure of the atmosphere is greater than the pressure in said cavity, and said projection being outwardly displaced from said outlet port when pressure in said cavity is greater than pressure of the atmosphere, thereby allowing the the flow of lubricant from said cavity through said outlet port and preventing the flow of lubricant into said cavity through, said outlet port, and said head assembly further comprises;

said outlet opening and said outlet port diagonally opposed in said cylindrical cavity, and said outlet opening, lubricant pervious retainer and outlet port abutting said piston when said piston is in said second depressed position.

2. A head assembly for a fluid lubricant dispenser as in claim 1; wherein, said cylindrical cavity is disposed at an angle to the longitudinal axis of said cylindrical head.

* * * * *